UNITED STATES PATENT OFFICE.

RICHARD GLEY, OF BERLIN, GERMANY, AND PAUL DIETERLE, OF LYON, FRANCE, ASSIGNORS TO ACTIEN GESELLSCHAFT FÜR ANILIN FABRIKATION, OF BERLIN, GERMANY.

OLIVE SULFUR DYE.

934,303.  Specification of Letters Patent.  Patented Sept. 14, 1909.

No Drawing.   Application filed May 24, 1909.   Serial No. 497,854.

*To all whom it may concern:*

Be it known that we, RICHARD GLEY, residing at Berlin, SW., Germany, (whose post-office address is Wilhelmstrasse 3ᵇ, Berlin, SW.,) and PAUL DIETERLE, residing at Lyon, France, (whose post-office address is Montée St. Laurent, Lyon,) citizens of the German Empire, have invented certain new and useful Improvements in New Sulfurized Dyestuffs and Manufacture Thereof, of which the following is a specification.

Our present invention relates to the manufacture of new sulfurized dyestuffs and is based on the following observation: If a mixture of para-aminophenol with meta-toluylenediamin is heated with sulfur, hydrogen-sulfid is evolved in great quantities, valuable sulfurized dyestuffs being obtained by the reaction. The tints produced with these coloring matters are, generally speaking, olive shades; the tints obtained depend, among others, to a great extent upon the proportions of the ingredients, and more especially upon those of aminophenol in relation to the meta-toluylenediamin.

The following example will serve to illustrate our invention, the parts being by weight: 110 parts of para-aminophenol, 61 parts of meta-toluylenediamin and 450 parts of sulfur are thoroughly mixed and then heated, the temperature being gradually raised to 250° C. This temperature is maintained until the mass becomes totally solid, whereupon the melt is allowed to cool, then pulverized and introduced into a suitable proportion of a boiling concentrated solution of sodium sulfid of about 50% strength. After solution the product is separated by adding hydrochloric acid, drained, washed with water and dried. The dyestuff thus obtained dyes cotton without a mordant from a dye-bath, containing an alkali-sulfid and a suitable salt, olive shades of an excellent fastness. This new product when pulverized forms a gray powder insoluble in alcohol and concentrated sulfuric acid, very sparingly soluble in water and concentrated liquor ammoniæ with a dull green color and readily soluble in soda-lye to a dull green solution.

It is obvious to those skilled in the art that our present invention is not limited to the foregoing example or to the details given therein. We may state, for instance, that a dyestuff of a more brown-olive shade is obtained, if one molecular proportion of para-aminophenol and one molecular proportion of meta-toluylenediamin are heated together with sulfur, the other conditions of the foregoing example being unchanged, whereas the proportions of the ingredients in the foregoing example correspond with two molecules of para-aminophenol and one molecule of meta-toluylenediamin. It follows therefrom that the proportions of these two ingredients have a distinct influence upon the tints obtained according to the present invention. On the other hand everybody skilled in the art is aware, that also the proportions of sulfur as well as the temperature and duration of the heating have an influence upon the shades obtained with the products resulting from sulfurizing melts.

Having now described our invention and in what manner it may be performed, what we claim as new is,—

1. As new articles of manufacture the new sulfurized dyestuffs, dyeing olive shades, which may be obtained by heating a mixture of para-aminophenol, meta-toluylenediamin and sulfur, which new dyestuffs when pulverized form gray powders, easily soluble in an alkali-sulfid-solution with a brownish color, very sparingly soluble in water and concentrated liquor ammoniæ and readily soluble in soda-lye to a dull green solution, and which new coloring matters are insoluble in alcohol and concentrated sulfuric acid.

2. As a new article of manufacture the olive sulfurized dyestuff which may be obtained by heating a mixture of two molecular proportions of para-aminophenol and one molecular proportion of meta-toluylenediamin with sulfur, this new dyestuff when pulverized forming a gray powder which is easily soluble in sodium sulfid-solution to a brownish-olive colored solution, very sparingly soluble in water and in concentrated liquor ammoniæ to a dull green solution and readily soluble in soda-lye to a dull green solution and which new coloring matter is insoluble in alcohol and concentrated sulfuric acid, this new dyestuff dyeing cotton without a mordant from a dyebath, containing an alkali-sulfid and a suitable salt, olive shades of an excellent fastness.

In testimony whereof we have hereunto set our hands in presence of two subscribing witnesses.

RICHARD GLEY.
PAUL DIETERLE.

Witnesses as to the signature of Richard Gley:
WOLDEMAR HAUPT,
HENRY HASPER.

Witnesses as to the signature of Paul Dieterle:
THOS. N. BROWNE,
MARIN VACHON.